United States Patent
Thomas et al.

(10) Patent No.: US 12,061,165 B2
(45) Date of Patent: Aug. 13, 2024

(54) PLASMONIC ORGANIC ELECTROCHEMICAL TRANSISTOR

(71) Applicant: University of Central Florida Research Foundation, Inc., Orlando, FL (US)

(72) Inventors: Jayan Thomas, Orlando, FL (US); Jinxin Li, Orlando, FL (US); Foram Madiyar, Port Orange, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 418 days.

(21) Appl. No.: 17/532,141

(22) Filed: Nov. 22, 2021

(65) Prior Publication Data
US 2022/0236215 A1    Jul. 28, 2022

Related U.S. Application Data

(60) Provisional application No. 63/141,089, filed on Jan. 25, 2021.

(51) Int. Cl.
*G01N 27/414* (2006.01)

(52) U.S. Cl.
CPC .............................. *G01N 27/4146* (2013.01)

(58) Field of Classification Search
CPC ........... G01N 27/4146; G01N 33/5005; G01N 27/4145; G01N 33/74; G01N 33/5438;
(Continued)

(56) References Cited

U.S. PATENT DOCUMENTS 10,281,464 B2 *  5/2019  Chen ................. G01N 33/54346
10,436,745 B2 * 10/2019  Star ........................ G01N 21/80
(Continued)

OTHER PUBLICATIONS

Chou et al., "Organic Electrochemical Transistors/SERS-Active Hybrid Biosensors Featuring Gold Nanoparticles Immobilized on Thiol-Functionalized PEDOT Films", Frontiers in Chemistry, Apr. 2019, pp. 1 through 12, vol. 7, Article 281, www.frontiersin.org.
(Continued)

*Primary Examiner* — Mouloucoulaye Inoussa
(74) *Attorney, Agent, or Firm* — Fogg & Powers LLC (57) ABSTRACT

One type of plasmonic organic electrochemical transistor (POECT) includes a channel comprising an organic semiconductor, a gate electrode comprising at least one of: an ensemble of nanoparticles and an array of nanostructures, wherein each of the at least one of: an ensemble of nanoparticles and an array of nanostructures comprises localized plasmonic material, an analyte formed at least one of: (a) over the at least one of: the ensemble of nanoparticles and the array of nanostructures and (b) around the at least one of: the ensemble of nanoparticles and the array of nanostructures, wherein an electrolyte is configured to be formed at least one of: between the channel and the gate electrode and over the channel and the gate electrode, a source electrode electrically connected to a first end of the channel; and a drain electrode electrically connected to a second end of the channel which is opposite the first end.

18 Claims, 5 Drawing Sheets

(58) Field of Classification Search
CPC ............. G01N 27/4148; G01N 27/414; G01N
33/569; G01N 33/56983; G01N
33/54346; G01N 33/56911; G01N
33/497; G01N 33/54373; G01N
33/57449; G01N 33/5308; G01N
2333/62; G01N 2333/165; G01N
2033/4975; G01N 2800/7028; G01N
2469/10; G01N 2458/30; G01N
2333/43573; G01N 2291/0256; G01N
2291/0255; G01N 2291/0426; A61B
5/6847; A61B 5/1473; A61B 5/6833;
A61B 5/4866; A61B 5/14532; A61B
5/1491; A61B 5/14539; A61B 5/14507;
A61B 5/6821; A61B 5/14546; A61B
5/1477; A61B 5/0004; A61B 5/0022;
A61B 5/14735; A61B 5/7203; A61B
2562/0285; A61B 2562/125; A61B
2562/046; H01L 29/06; H01L 23/532;
H01L 29/0673; H01L 29/16; H01L
21/02527; H01L 21/02664; H01L
29/1606; H01L 21/02425; H01L 23/38;
H01L 21/0262; H01L 29/24; H01L
27/085; H01L 29/068; H01L 29/775;
H01L 21/0259; H01L 2221/68368; H01L
2221/68381; H01L 2221/68354; B82Y
15/00; H10K 85/225; H10K 10/466;
H10K 10/484; H10K 85/20; H10K
85/761; H10K 10/488; H10K 85/221;
H10K 10/486; B01L 3/502761; B01L
3/502715; B01L 2300/12; B01L
2300/0887; B01L 2300/0858; B01L
2300/0627; B01L 3/5027; B01L 3/15;
C12Q 1/6869; C12Q 1/6874; C12Q
1/6825; C12Q 2563/157; C12Q 2565/607;
G01R 19/0092; H03K 3/0315; Y10S
977/746; Y10S 977/92; C01B 32/168;
C01B 2202/02; C07K 2319/21
See application file for complete search history.

(56) References Cited

U.S. PATENT DOCUMENTS

| | | | | |
|---|---|---|---|---|
| 11,415,546 | B2* | 8/2022 | Johnson | H10K 10/466 |
| 11,732,296 | B2* | 8/2023 | van Rooyen | G01N 27/4148 |
| | | | | 257/29 |
| 2008/0221806 | A1* | 9/2008 | Bryant | B82Y 30/00 |
| | | | | 422/198 |
| 2010/0282245 | A1* | 11/2010 | Star | G01N 33/0037 |
| | | | | 128/200.14 |
| 2010/0298764 | A1* | 11/2010 | Yodfat | A61B 5/1459 |
| | | | | 604/66 |
| 2011/0215002 | A1* | 9/2011 | Martinez | G01N 27/4146 |
| | | | | 205/792 |
| 2014/0083872 | A1* | 3/2014 | Fuerst | A61B 5/14532 |
| | | | | 205/792 |
| 2016/0238553 | A1* | 8/2016 | Shachar | G01N 27/4145 |
| 2017/0018626 | A1* | 1/2017 | Hoffman | G01N 27/4146 |
| 2017/0053908 | A1* | 2/2017 | Hoffman | H01L 29/1606 |
| 2017/0059514 | A1* | 3/2017 | Hoffman | G01N 33/5438 |
| 2017/0102358 | A1* | 4/2017 | Hoffman | H01L 29/66409 |
| 2017/0350856 | A1* | 12/2017 | Kobayashi | G01N 27/4145 |
| 2019/0041354 | A1* | 2/2019 | Boyanov | G01N 27/4145 |
| 2019/0086360 | A1* | 3/2019 | Swager | G01N 27/308 |
| 2019/0200923 | A1* | 7/2019 | Patolsky | A61B 5/6847 |
| 2019/0346401 | A1* | 11/2019 | Kralicek | G01N 27/122 |
| 2020/0096475 | A1* | 3/2020 | Scavetta | G01N 27/4146 |
| 2021/0293798 | A1* | 9/2021 | Kornberg | G01N 33/5438 |
| 2022/0113306 | A1* | 4/2022 | Mower | G01N 27/4146 |
| 2022/0155289 | A1* | 5/2022 | Goldsmith | G01N 33/5438 |
| 2022/0365078 | A1* | 11/2022 | Star | G01N 33/569 |
| 2023/0022648 | A1* | 1/2023 | Shalev | G01N 27/4145 |

OTHER PUBLICATIONS

Juluri et al., "Effects of Geometry and Composition on Charge-Induced Plasmonic Shifts in Gold Nanoparticles", J. Phys. Chem. C 2008, Jan. 9, 2008, pp. 7309 through 7317, vol. 112, No. 19, American Chemical Society.

Kim et al., "Organic electrochemical transistor based immunosensor for prostate specific antigen (PSA) detection using gold nanoparticles for signal amplification", Biosensors and Bioelectronics 25, Apr. 9, 2010, pp. 2477 through 2482, Elsevier.

Nusz et al., "Rational Selection of Gold Nanorod Geometry for Label-Free Plasmonic Biosensors", ACSNANO, Mar. 9, 2009, pp. 795 through 806, vol. 3, No. 4, American Chemical Society, www.acsnano.org.

Peng et al., "An organic electrochemical transistor for determination of microRNA21 using gold nanoparticles and a capture DNA probe", Microchimica Acta (2018) 185: 408, Aug. 10, 2018, pp. 1 through 8, Springer.

Song et al., "Organic Photo-Electrochemical Transistor-Based Biosensor: A Proof-of-Concept Study toward Highly Sensitive DNA Detection", Adv. Healthcare Mater., 2018, 7, pp. 1 through 8, Advanced Science News, Advanced Healthcare Materials.

Tam et al., "Geometrical Parameters Controlling Sensitivity of Nanoshell Plasmon Resonances to Changes in Dielectric Environment", J. Phys. Chem. B 2004, Jun. 11, 2004, pp. 17290 through 17294, vol. 108, No. 45, American Chemical Society.

Zhang et al., "Highly sensitive glucose sensors based on enzyme-modified whole-graphene solution-gated transistors", Scientific Reports 5:8311, Feb. 6, 2015, pp. 1 through 6.

* cited by examiner

PLASMONIC ORGANIC ELECTROCHEMICAL TRANSISTOR

CROSS-REFERENCE TO RELATED APPLICATIONS

This patent application claims benefit of U.S. Patent Application Ser. No. 63/141,089, filed Jan. 25, 2021; the entire contents of the aforementioned patent application are incorporated herein by reference as if set forth in its entirety.

U.S. GOVERNMENT LICENSE RIGHTS

This invention was made with Government support under Award No. ECCS-1351757 awarded by NSF. The Government has certain rights in the invention.

BACKGROUND

An organic electrochemical transistor (OECT) utilizes a basic field effect transistor (FET) architecture having gate, drain, and source electrodes. However, the channel is fabricated with an organic semiconductor, rather than an inorganic semiconductor channel, between the drain and the source electrodes. The organic semiconductor channel may be a polymer. Further, the OECT has an electrolyte between the organic semiconductor channel and a gate electrode. The semiconductor channel is immersed into the electrolyte.

The electrolyte can be a liquid or a gel. An OECT can be formed on different types of insulating and semiconductor substrates, including fiber, paper, plastic, and elastomer. An OECT is stable in aqueous or organic electrolyte environments.

Drain current of an OECT is controlled by an injection of ions from the electrolyte into the organic semiconductor channel. As with other types of FETs, a supply voltage is applied between the drain and source electrodes to provide current flow between the drain and source electrodes. When a bias voltage is applied between the gate and source electrodes, ions (cations or anions) from the electrolyte are injected into the organic semiconductor channel changing electronic charge density in the organic semiconductor channel and thus the drain current.

Direct injection of ions from the electrolyte into the organic semiconductor channel affects a transconductance of the OECT. Therefore, any change (e.g., due to oxidation-reduction) at the gate is translated to a change in the transconductance of the OECT. The injection of ions takes place in a whole volume of the channel of the OECT, and thus a small variation in the gate voltage, e.g., due to the oxidation-reduction, is reflected in the channel by a change in the transconductance of the OECT. In metal insulator semiconductor FETs, a small variation in the gate voltage affects only two-dimensional interface between the insulator, e.g., oxide, and the channel. Because the whole volume of the channel, the OECT has enhanced transconductance and thus sensitivity in comparison to other types of FETs. Because of its aforementioned benefits, the OECT is considered for use as a highly sensitive biosensor.

SUMMARY

A plasmonic organic electrochemical transistor comprises: a channel comprising an organic semiconductor; a gate electrode comprising at least one of: an ensemble of nanoparticles and an array of nanostructures, wherein each of the least one of: an ensemble of nanoparticles and an array of nanostructures comprises localized plasmonic material; an analyte formed at least one of: (a) over the at least one of: the ensemble of nanoparticles and the array of nanostructures and (b) around the at least one of: the ensemble of nanoparticles and the array of nanostructures; wherein an electrolyte is configured to be formed at least one of: between the channel and the gate electrode and over the channel and the gate electrode; a source electrode electrically connected to a first end of the channel; and a drain electrode electrically connected to a second end of the channel which is opposite the first end.

A method for operating a transistor, the method comprising: applying a bias to a control electrode of the transistor, wherein the control electrode comprises at least one of: an array of nanostructures and an ensemble of nanoparticles, and wherein each of the at least one of: an array of nanostructures and an ensemble of nanoparticles comprises localized plasmonic material; receiving non-ionizing incident radiation at the at least one of: the array of nanostructures and the ensemble of nanoparticles to generate hot electrons and heat at nanoparticles of the ensemble of nanoparticles and nanostructures of the array of nanostructures; in comparison to when the non-ionizing incident radiation is not received at the at least one of: the array of nanostructures and the ensemble of nanoparticles, increasing a chemical reaction rate in an analyte, or a material or a chemical generated from the analyte, wherein the analyte is formed at least one of: (a) over the at least one of: the ensemble of nanoparticles and the array of nanostructures and (b) around the at least one of: the ensemble of nanoparticles and the array of nanostructures; in comparison to when the non-ionizing incident radiation is not received at the at least one of: the array of nanostructures and the ensemble of nanoparticles, increasing a rate of change of charge generation in the control electrode; in comparison to when the non-ionizing incident radiation is not received at the at least one of: the array of nanostructures and the ensemble of nanoparticles, increasing or decreasing a rate of change of ions injected between an electrolyte and an organic semiconductor; and for a given change in the bias between the control electrode and a non-control electrode of the transistor, enhancing an increase or a decrease of an amount of current flowing through the transistor.

A method of fabricating a transistor, the method comprising: forming, over a substrate, a control electrode and two non-control electrodes of a transistor, wherein the control electrode comprises at least one of: an array of nanostructures and an ensemble of nanoparticles, and wherein each of the at least one of: an array of nanostructures and an ensemble of nanoparticles comprises localized plasmonic material; forming, over the substrate, an organic semiconductor; forming an electrolyte at least one of: between the organic semiconductor and the control electrode and over the organic semiconductor and the control electrode; and forming, at least one of: over the array of nanostructures and around the array of nano structures, an analyte.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized, and that logical, mechanical, and electrical changes may be made without departing from the scope of the present invention. The following detailed description is, therefore, not to be taken in a limiting sense.

Embodiments of the invention improve transconductance, and thus sensitivity, of an OECT by utilizing a gate electrode formed by or including an array of plasmonic nanostructures and/or an ensemble of plasmonic nanoparticles, and with an analyte on and/or about the gate electrode. An ensemble of plasmonic nanoparticles means plasmonic nanoparticles where each plasmonic nanoparticle is separated from other plasmonic nanoparticles, i.e., each plasmonic nanoparticle is not in contact with another plasmonic nanoparticle. The analyte is a chemical, e.g., a bio-chemical, being sensed (or identified) and/or analyzed with a plasmonic OECT.

An OECT whose gate electrode formed by or comprising at least one of: (a) an array of plasmonic nanostructures and (b) an ensemble of plasmonic nanoparticles may be referred to as a Plasmonic OECT or a POECT. Each plasmonic nanostructure and each plasmonic nanoparticle is formed with localized plasmonic material. Localized plasmonic material is a material, when forming an array of nanostructures and/or an ensemble of nanoparticles, generate an electromagnetic field which resonates with an electromagnetic field of incident radiation (including a wavelength that is a resonant wavelength of the array of nanostructures and/or the ensemble of nanoparticles). For purposes of clarity, the incident radiation is non-ionizing radiation. Optionally, the incident radiation comprises an optical signal. The resonant wavelength is dependent upon dimension(s) of the array of nanostructures and/or the ensemble of nanoparticles.

Incident radiation means radiation incident upon the array of nanostructures and/or the ensemble of nanoparticles. The electromagnetic field from the incident radiation excites electrons in the localized plasmonic material to higher energy states. Due to the excitation, electrons can transfer from the localized plasmonic material (e.g., the to the analyte. Due to de-excitation of electrons, heat can be generated (i.e., localized heating) by the localized plasmonic material can be transferred to the analyte. Localized plasmonic material may be conductor, such as a metal (e.g., gold, silver, platinum, aluminum, or copper) or metal alloy; however, localized plasmonic material may also include without limitation transition metal nitride(s) (e.g., titanium nitride) and quasi-metal(s) (e.g., graphene).[1] Each plasmonic nanostructure has a resonant frequency corresponding to dimension(s), for example a radius of a nanohole, of the plasmonic nanostructure.

[1] Thus, plasmonic nanostructure means a nanostructure formed from or comprising localized plasmonic material. Plasmonic particle means a nanoparticle formed from or comprising localized plasmonic material.

Plasmonic effect means generation of heat and hot electrons at a nanostructure or nanoparticle when the incident electromagnetic field is incident upon respectively the nanostructure or nanoparticle. An enhanced localized near electromagnetic field (created by the plasmonic effect) generates heat and hot electrons in the localized plasmonic material. The heat and hot electrons accelerate a chemical or a physical reaction in the analyte, or a material or a chemical generated from the analyte. A physical reaction may include generation of charged particles and/or a phase change. The chemical reaction is accelerated because the heat and the hot electrons cause chemical bonds (between atom(s) and/or ion(s) comprising molecule(s) forming the analyte or the material or the chemical generated by the analyte) to be more vigorously vibrated. Such chemical bonds are more easily broken due to the more vigorous vibration of the chemical bonds. As a result, efficiency of catalyzation of the analyte, or the material or the chemical generated by the analyte, is increased. Because a POECT enhances efficiency of catalyzation of an analyte, or the material or the chemical generated by the analyte, the POECT is able to detect lower concentrations of an analyte (or the material or the chemical generated by the analyte) in comparison to an OECT.

A nanostructure means a structure of matter having at least one dimension between 1 and 500 nanometers (nm), e.g., diameter or length. A nanodot, a nanohole a nanofiber, a nanotube, and a nanopillar are non-limiting examples of nanostructures. A nanoparticle means a particle of matter having at least one dimension between 1 and 100 nm in dimension, e.g., diameter.

Figure 1A:
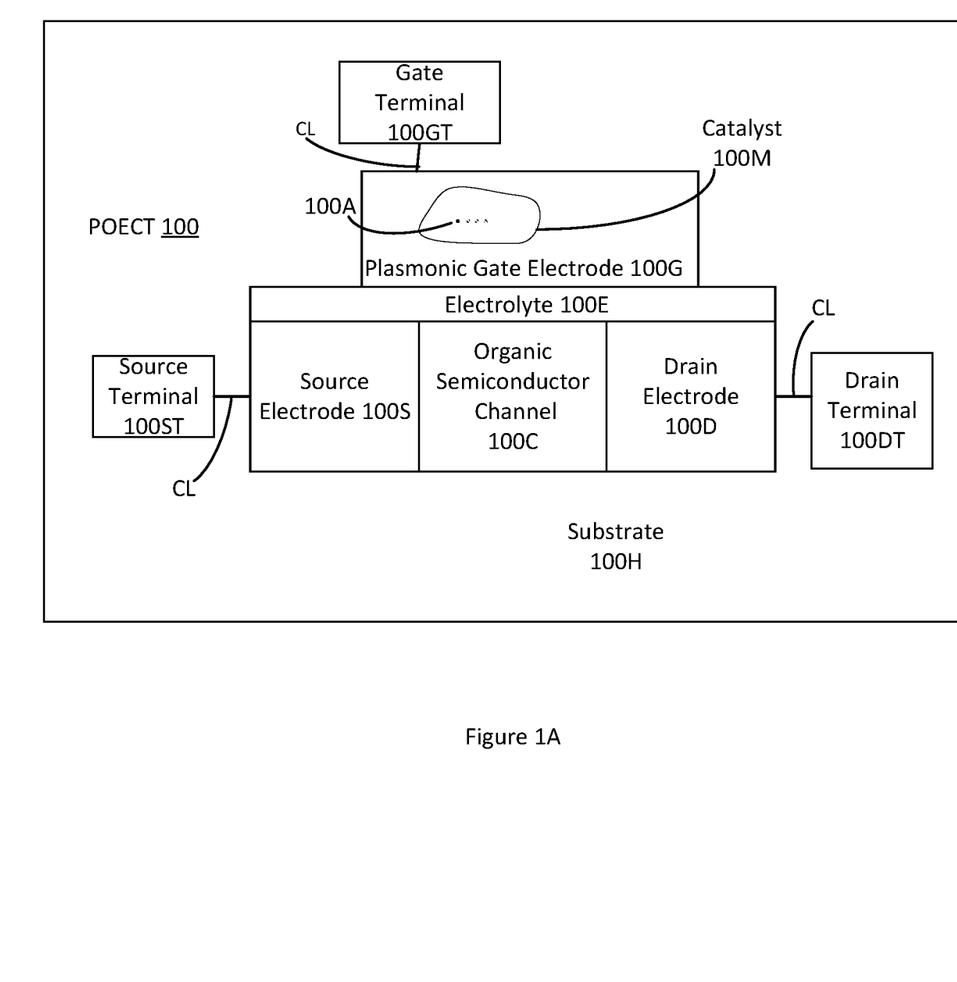
FIG. 1A illustrates a plan view of one embodiment of a plasmonic organic electrochemical transistor.

Although other POECT structures with a control node and non-control nodes, exemplary embodiments of POECTs are subsequently described for pedagogical purposes. FIG. 1A illustrates a plan view of one embodiment of a plasmonic organic electrochemical transistor 100. The POECT 100 comprises a plasmonic gate electrode 100G, an electrolyte 100E, an organic semiconductor channel 100C, a source electrode 100S, a drain electrode 100D, and a substrate 100H. The plasmonic gate electrode 100G includes an array of plasmonic nanostructures (array) 100A. The array of plasmonic nanostructures 100A may be symmetric or asymmetric. The array of plasmonic nanostructures 100A may be a two- or three-dimensional array. A symmetric array comprises nanostructures which each have the same dimension(s) and where each set of adjacent nanostructures are spaced apart by the same dimension (or distance). Optionally, the symmetric array comprises nanodots may be formed on the substrate 100H and having the same radius, e.g., 100 nm and the same distance between the centers of adjacent nanodots, e.g., 200 nm. An asymmetric array comprises nanostructures which may be of different types, may have different dimension(s) for the same type of nanostructure, and/or may have different distances between adjacent nanostructures.

The source electrode 100S and the drain electrode 100D are each electrically connected to opposite ends of the organic semiconductor channel 100C. At least the source electrode 100S, the drain electrode 100D comprise a metal or a metal alloy, e.g., gold, silver, platinum, aluminum, or copper. Optional gate, drain, and source terminals 100GT, 100DT, 100ST, facilitating external electrical connection to the plasmonic gate electrode 100G, source electrode 100S, and the drain electrode 100D, and the conductive lines CL electrically coupling each terminal to each electrode also comprise the metal, the metal alloy, or any other localized plasmonic material, and are formed on or above the substrate 100H; if formed above the substrate, then there may be one or more layers of other material that separate such an element from the substrate. Thus, the electrodes, terminals, and connecting lines may be formed with the same material which is a localized plasmonic material. Optionally, the terminal is a bond pad. Optionally, the plasmonic nanostructures of the plasmonic gate electrode 100G comprises the metal or the metal alloy. Each of the plasmonic gate electrode 100G, the source electrode 100S, and drain electrode 100D are formed on the substrate 100H. The optional terminals and conductive lines are also formed on the substrate 100H.

The organic semiconductor channel 100C is formed at least between the source electrode 100S and the drain electrode 100D. Optionally, the organic semiconductor channel 100C may also be formed between the source electrode 100S and the drain electrode 100D. Optionally the organic semiconductor channel 100C is a semiconducting polymer, e.g., poly(3,4-ethylenedioxythiophene) polystyrene sulfonate (PEDOT:PSS).

The electrolyte 100E is deposited at least one of: between the organic semiconductor channel 100C and the plasmonic gate electrode 100G and over the organic semiconductor channel 100C and the plasmonic gate electrode 100G. Optionally, the electrolyte 100E is deposited at least one of between the analyte 100N and the organic semiconductor channel 100C and over the analyte 100N and the organic semiconductor channel 100C. Optionally, the electrolyte may be phosphate buffered saline (PBS), a salt (e.g., sodium chloride (NaCl)), fluid in a living entity (e.g., in a human for example in a brain), and/or another type of electrolyte. Optionally, the POECT 100 comprises an optional catalyst 100M deposited at least on and/or around or about the array 100A. As is discussed elsewhere herein, the optional catalyst 100M may be used to facilitate a chemical reaction in an analyte.

The substrate 100H may be an insulator, e.g., glass, sapphire, and/or an undoped semiconductor. Optionally, the substrate 100H is transparent or at least translucent at a wavelength of an optical signal; this permits the optical signal 100L to illuminate the array 100A of the plasmonic gate electrode 100G through the substrate 100H.

Figure 1B:
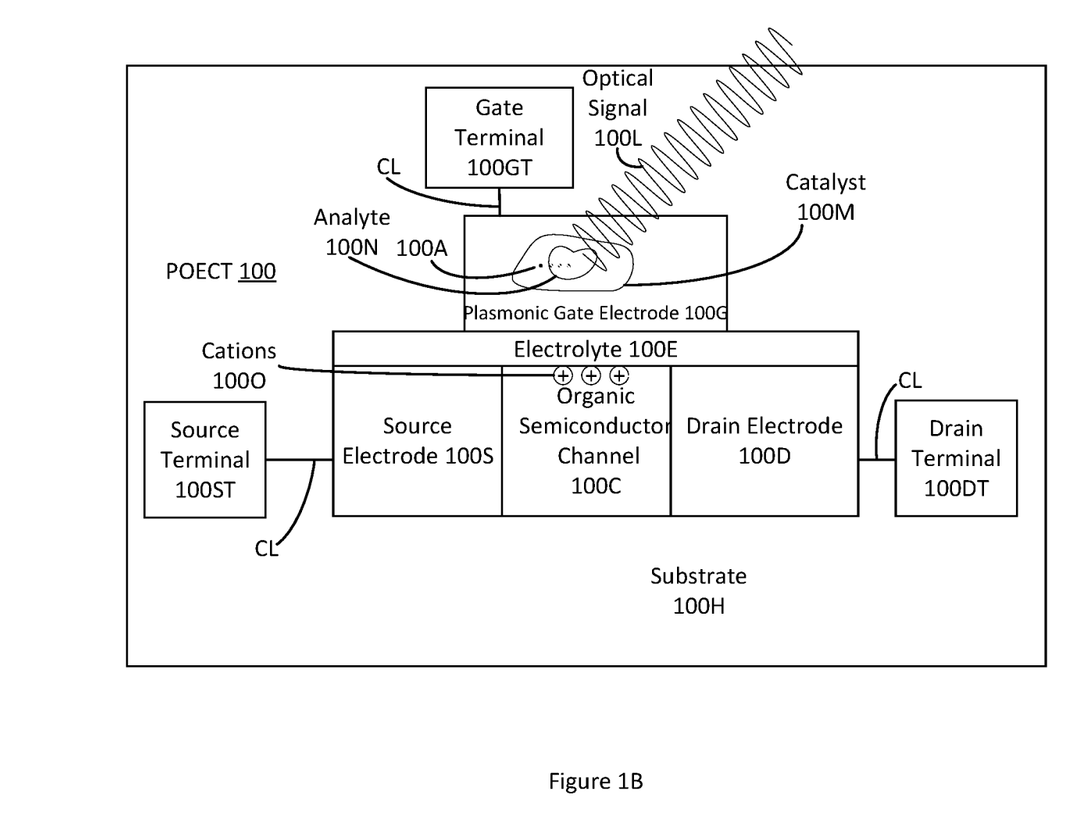
FIG. 1B illustrates a plan view of one embodiment of a plasmonic organic electrochemical transistor of FIG. 1A additionally including an analyte and an optional catalyst.

FIG. 1B illustrates a plan view of one embodiment of a plasmonic organic electrochemical transistor 100 of FIG. 1A additionally including an analyte 100N and the optional catalyst 100M. When the POECT 100 is utilized, e.g., as a biological or chemical sensor, the analyte 100N is deposited on and/or around the array 100A. If an optional catalyst 100M is utilized, the analyte 100N is deposited on the optional catalyst 100M. Analyte means a substance that is being identified and/or characterized. Catalyst means a material used to accelerate a chemical reaction rate of the analyte. Optionally, the catalyst may be glucose oxidase and the analyte may be glucose; however, an alternate or no catalyst and/or an alternate analyte may be used.

For pedagogical purposes, the incident radiation will be illustrated as an optical signal. An optical signal 100L, generated by an optical source, is incident upon the array 100A of the plasmonic gate electrode 100G. Optionally, the optical signal 100L comprises substantially a single wavelength corresponding to the resonant wavelength of each nanostructure of the array 100A. For example, the wavelength may be 650 nm or any other wavelength. The resonant wavelength of the optical signal 100L stimulates the plasmonic effect in the array 100A and increases a rate of reaction in the analyte 100N (or a material or a chemical created from the analyte 100N, e.g., by the optional catalyst 100M). The increased reaction rate in the analyte 100N (or the material or the chemical created from the analyte 100N) increases a rate of generation of a type of charged particles, e.g., electrons, in the plasmonic gate electrode 100G.[2] The increased rate of generation of charged particles increases a rate at which a bias voltage (applied by an external voltage source between the plasmonic gate electrode 100G and the source electrode 100S) is modified. The increased rate at which the gate to source bias voltage is modified increases the rate of change of ions injected between the electrolyte 100E and the organic semiconductor channel 100C. Ions may be injected from the electrolyte 100E into the organic semiconductor channel 100C, or vice versa. A rate of change in current flow in the organic semiconductor channel 100C (between the drain electrode 100D and source electrode 100S) is increased or decreased due to the respective increased or decreased rate of change of injected ions. Thus, as a result, a transconductance of the POECT 100 is respectively increased or decreased.

[2] If the analyte is glucose and the catalyst is glucose oxidase, gluconolactone and hydrogen peroxide are generated. The hydrogen peroxide decomposes into water and oxygen while releasing electrons.

For example, if a positive bias voltage is applied between the plasmonic gate electrode 100G and the source electrode 100S and electrons are generated in the plasmonic gate electrode 100G, then an additional voltage is generated at the gate. Therefore, the resulting effective gate voltage (e.g., more positive when oxidation take place; less positive when reduction take place) drives the transconductance. The effective gate voltage may be determined by equation:

$$V_g^{eff} = V_g + (1+\gamma)\frac{kT}{2e} \ln[\text{reactant}]$$

where $V_g^{eff}$ is an effective voltage, $V_g$ is a gate voltage, y is a channel to gate capacitance ratio, k is the Boltzmann constant, T is a temperature, e is an electronic charge, and [reactant] is a concentration of a reactant, e.g., $H_2O_2$, that generates charge, e.g., by oxidation. From the equation, it is clear that as the concentration of the reactant increases, the effective gate voltage increases. As a result of the increased positive bias, more cations 100O are injected from the electrolyte 100E into the organic semiconductor channel 100C. These cations compensate for anions, e.g., sulfonate anions, present in the organic semiconductor channel 100C, e.g., in the PSS part of the organic semiconductor channel 100C. As a result, the holes that are extracted at the drain are not replenished at the source which decreases the drain current and makes the device switch to a depletion state. Note, because charged particles of either positive or negative polarity may be generated in the plasmonic gate electrode, ions of either positive or negative polarity may be injected from the electrolyte 100E into the organic semiconductor channel 100C, and a bias voltage of either a positive or a negative polarity may be applied across the plasmonic gate electrode 100G and the source electrode 100S.

Figure 2:
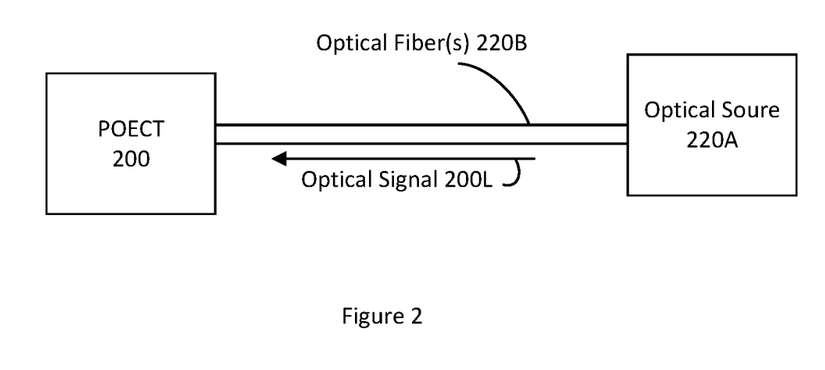
FIG. 2 illustrates a block diagram of one embodiment of a plasmonic organic electrochemical transistor optically coupled to an optical source through an optical fiber.

FIG. 2 illustrates a block diagram of one embodiment of a plasmonic organic electrochemical transistor optically coupled to an optical source through at least one optical fiber. Optionally, the POECT 200 may be implemented as illustrated in FIG. 1A or 1B. An optical source 220A, e.g., a laser, generates an optical signal 200L. The optical source 220A is optically coupled to the POECT through at least one optical fiber (optical fiber(s)) 220B. One end of the optical fiber may terminate into a surface of the substrate 100H opposite a surface of the substrate on which the array 100A (and thus the analyte 100N and optional catalyst 100M) are formed. If the substrate 100H is transparent, or at least translucent, at the wavelength of the optical signal 200L, then the optical signal 200L will stimulate (or induce) a plasmonic effect. Although optical fiber(s) 220B are illustrated in FIG. 2, the optical signal 200L may be propagated alternatively or additionally though an alternative type of optical waveguide, e.g., a planar optical waveguide (e.g., made with silicon nitride and silicon dioxide), and/or through free space.

Figure 3:
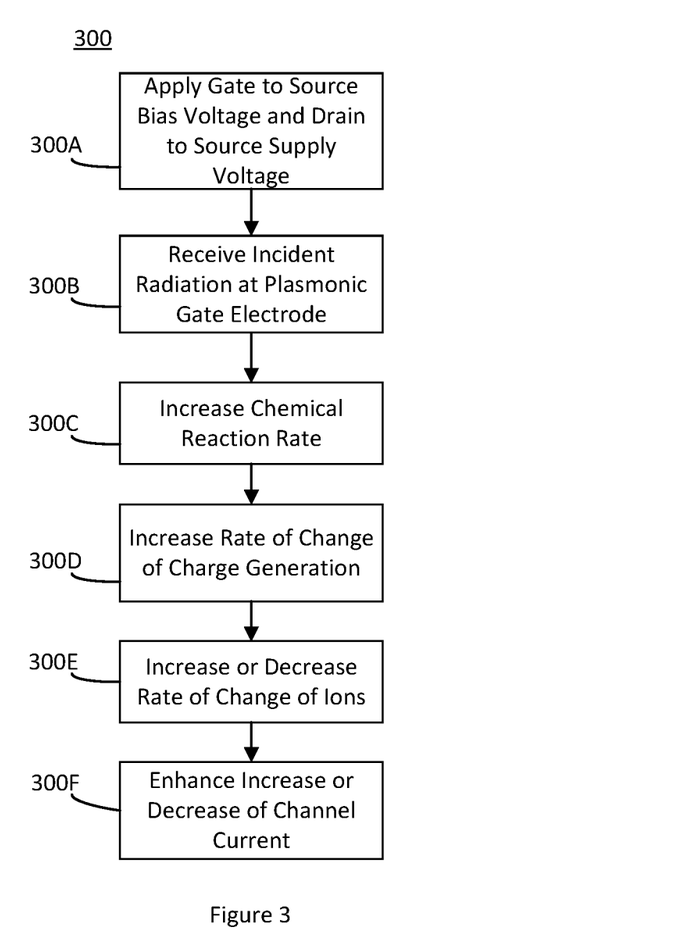
FIG. 3 illustrates a flow diagram of one embodiment of a method of operation of a plasmonic organic electrochemical transistor.

FIG. 3 illustrates a flow diagram of one embodiment of a method 300 of operation of a plasmonic organic electrochemical transistor. The blocks of the flow diagram have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner). The flow diagram of FIG. 3 need not only be implemented with the structure illustrated with respect to FIGS. 1A-2.

In block 300A, a gate to source bias voltage is applied across gate and source electrodes, and a drain to source supply voltage is applied across drain and source electrodes. In block 300B, incident radiation, e.g., an optical signal, is received at an array of nanostructures and/or an ensemble of nanoparticles of a plasmonic gate electrode, where the incident radiation comprises a wavelength that stimulates a plasmonic effect in the plasmonic gate electrode (e.g., in the array of nanostructures and/or the ensemble of nanoparticles). Optionally, the optical signal comprises substantially a single wavelength.

In block 300C, a chemical reaction rate in an analyte (or a material or a chemical generated from the analyte) on and/or around the array is increased in comparison to when no incident radiation is received at the array of nanostructures and/or the ensemble of nanoparticles of the plasmonic gate electrode. In block 300D, a rate of charge generation in the plasmonic gate structure is increased in comparison to when no incident radiation is received at the array of nanostructures and/or the ensemble of nanoparticles of the plasmonic gate electrode. In block 300E, a rate of change of ions injected between an electrolyte and an organic semiconductor channel is increased or decreased in comparison to when no incident radiation is received at the array of nanostructures and/or the ensemble of nanoparticles of the plasmonic gate electrode. Whether the rate increases or decreases depends upon a type of reaction taking place at the plasmonic gate electrode and the analyte.

In block 300F, for a given change in gate to source bias voltage, an increase or decrease in an amount of current flow in the organic semiconductor channel (between the drain and source terminals) is enhanced in comparison to when no incident radiation is received at the array of nanostructures and/or the ensemble of nanoparticles of the plasmonic gate electrode. Thus, POECT transconductance is enhanced.

Figure 4:
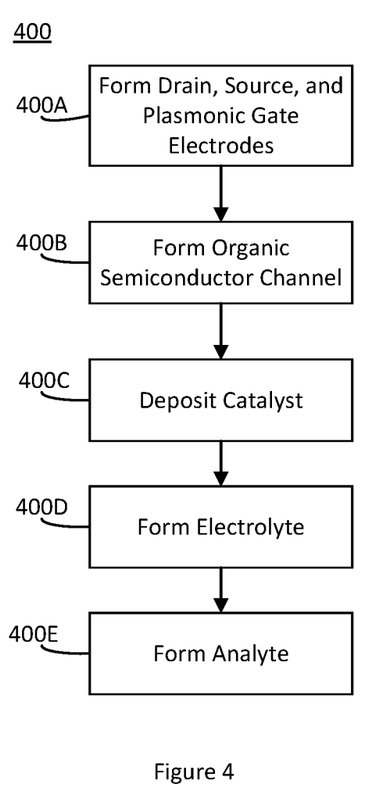
FIG. 4 illustrates a flow diagram of one embodiment of a method for making a plasmonic organic electrochemical transistor.

FIG. 4 illustrates a flow diagram of one embodiment of a method 400 for making a plasmonic organic electrochemical transistor. In block 400A, drain, source, and plasmonic gate electrodes are formed on and/or over a substrate. Optionally, the terminals and the conductive lines are also formed on the substrate. The drain electrode, source electrode, plasmonic gate electrode, drain terminal, source terminal, gate terminal, and/or conductive lines may be formed at the same time, e.g., with the same manufacturing step(s). Optionally, block 400A is implemented as follows. A first mask of a polymer, e.g., polyacrylonitrile (PAN), may be formed by spin-coating the polymer on a mold, e.g., made from etched silicon, and then annealing, e.g., at 105 degrees Celsius. The mold includes raised portions that generate openings in the first mask defining the nanostructures of the array, the electrodes, the terminals, and/or the conductive lines. The first mask is then removed from the mold. Optionally, the dimensions of the openings, particularly for the nanostructures, may be increased by etching the mask, e.g., with a plasma etching. The first mask may have more than one reticle, where each reticle comprises a POECT. The first mask is then placed over the substrate. Localized plasmonic material is deposited, e.g., using chemical vapor deposition, plasma deposition, or physical vapor deposition, through certain openings in the mask to form electrodes and optionally connection lines; however, the localized plasmonic material does not fill openings in the first mask defining nanostructures. Thus, nanoholes are formed, and are electrically connected by the localized plasmonic material surrounding each opening in the first mask and of the nanostructure array; such localized plasmonic material surrounding the openings forms the gate electrode. The localized plasmonic material is used to form the drain, source, and plasmonic gate electrodes comprising an array of nanostructures and/or an ensemble of nanoparticles. Optionally, the localized plasmonic material is used to form the conductive lines. Each of the drain electrode, the source electrode, the plasmonic gate electrodes, the organic semiconductor channel, and the conductive line(s) may be formed on and/or above the substrate.

In block 400B, the organic semiconductor channel is formed on and/or over the substrate, and optionally over at least a portion of one or both of the source electrode and the drain electrode. Optionally, the organic semiconductor channel may be formed by placing a second mask over the substrate with the deposited localized plasmonic material, and depositing, e.g., with spin coating or another type of deposition, and organic semiconductor. Optionally, the organic semiconductor is formed in opening(s) in the second mask. Optionally, the organic semiconductor is formed on and/over the substrate. If spin coating is used, then optionally a 2000 rpm spin speed may be used for thirty seconds; after finishing spin coating, then optionally annealing the substrate with the organic semiconductor for ten minutes at 130 degrees Celsius; however, the foregoing parameter values may be varied. The second mask is then removed. The second mask may be formed like the first mask. Alternatively, the first and/or second mask can be formed in alternative ways, e.g., using conventional semiconductor manufacturing techniques such as depositing and exposing photoresist to form a mask.

Optionally, in block 400C, the optional catalyst is deposited on and/or around the array. The optional catalyst may be deposited by pipette(s), microfluidic channel(s), and/or any other fluidic device(s).

In block 400D, the electrolyte is formed at least between an organic semiconductor channel and the plasmonic gate electrode 100G. The electrolyte may be formed, e.g., deposited, using pipette(s), microfluidic channel(s), and/or any other fluidic device(s).

In block 400E, analyte is formed on and/or around the array. If the optional catalyst is utilized, the analyte is formed on the catalyst. The analyte may be formed, e.g., deposited, using pipette(s), microfluidic channel(s), and/or any other fluidic device(s).

Terms of relative position as used in this application are defined based on a plane parallel to the conventional plane or working surface of a material (e.g., a layer or a substrate), regardless of orientation. Terms such as "on," "higher," "lower," "over," "top," and "under" are defined with respect to the conventional plane or working surface being on the top surface of a layer or substrate, regardless of orientation. Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A plasmonic organic electrochemical transistor, comprising:
   a channel comprising an organic semiconductor;
   a gate comprising:
      a plasmonic gate electrode comprising an ensemble of nanoparticles including localized plasmonic material configured to generate an electromagnetic field which resonates with another electromagnetic field of incident electromagnetic radiation and/or an array of nanostructures including the localized plasmonic material; and
      an analyte formed at least one of: (a) over: the ensemble of nanoparticles and/or the array of nanostructures and (b) around the ensemble of nanoparticles and/or the array of nanostructures;
   wherein an electrolyte is configured to be formed at least one of: between the channel and the plasmonic gate electrode and over the channel and the plasmonic gate electrode;
   a source electrode electrically connected to a first end of the channel; and
   a drain electrode electrically connected to a second end of the channel which is opposite the first end.

2. The plasmonic organic electrochemical transistor of claim 1, further comprising a catalyst formed at least one of: over the ensemble of nanoparticles and/or the array of nanostructures and around the ensemble of nanoparticles and/or the array of nanostructures.

3. The plasmonic organic electrochemical transistor of claim 2, wherein the analyte is formed over the catalyst.

4. The plasmonic organic electrochemical transistor of claim 2, wherein the catalyst comprises glucose oxidase and the analyte comprises glucose.

5. The plasmonic organic electrochemical transistor of claim 1, wherein the electrolyte is formed at least one of: between the analyte and the channel and over the analyte and the channel.

6. The plasmonic organic electrochemical transistor of claim 1, wherein the array of nanostructures comprises an array of nanoholes.

7. The plasmonic organic electrochemical transistor of claim 1, wherein the incident electromagnetic radiation is configured to generate hot electrons and heat nanoparticles of the ensemble of nanoparticles and/or nanostructures of the array of nanostructures.

8. The plasmonic organic electrochemical transistor of claim 1, wherein the incident electromagnetic radiation comprises an optical signal.

9. The plasmonic organic electrochemical transistor of claim 1, wherein the organic semiconductor comprises a semiconducting polymer.

10. The plasmonic organic electrochemical transistor of claim 1, wherein the localized plasmonic material comprises at least one of a conductor, a transition metal nitride, and a quasi-metal.

11. The plasmonic organic electrochemical transistor of claim 1, wherein the array of nanostructures comprises at least one of: a nanodot, a nanohole, a nanofiber, a nanotube, and a nanopillar.

12. The plasmonic organic electrochemical transistor of claim 1, wherein the electrolyte is further configured to be formed at least one of: between the channel and the array of nanostructures and/or the ensemble of nanoparticles, and over the channel and the array of nanostructures and/or the ensemble of nanoparticles.

13. The plasmonic organic electrochemical transistor of claim 1, further comprising the electrolyte.

14. The plasmonic organic electrochemical transistor of claim 1, further comprising:
   a substrate;
   wherein the electrolyte, the plasmonic gate electrode, the organic semiconductor, the source electrode, and the drain electrode are formed over the substrate.

15. A method of fabricating a transistor, the method comprising:
   forming, over a substrate, a plasmonic gate electrode, a source electrode, and a drain electrode of the transistor, wherein the plasmonic gate electrode comprises an array of nanostructures including localized plasmonic material configured to generate an electromagnetic field which resonates with another electromagnetic field of incident radiation and/or an ensemble of nanoparticles including the localized plasmonic material;
   forming, over the substrate, an organic semiconductor;
   forming an electrolyte at least one of: between the organic semiconductor and the plasmonic gate electrode and over the organic semiconductor and the plasmonic gate electrode; and
   forming, at least one of: (a) over the array of nanostructures and/or the ensemble of nanoparticles and (b) around the array of nanostructures and/or the ensemble of nanoparticles, an analyte.

16. The method of claim 15, further comprising forming a catalyst at least one of: (a) over the array of nanostructures and/or the ensemble of nanoparticles and (b) around the array of nanostructures and/or the ensemble of nanoparticles;
   wherein the electrolyte is formed over the catalyst.

17. The method of claim 15, wherein forming the plasmonic gate electrode comprising the array of nanostructures and/or the ensemble of nanoparticles comprises:
   forming a mask comprising with openings which define each nanostructure forming the array of nanostructures; and depositing, through the openings in the mask and over the substrate, the localized plasmonic material.

18. The method of claim 15, wherein forming the organic semiconductor comprises forming the organic semiconductor adjacent to the drain and the source electrodes.

\* \* \* \* \*